ALLOY PRINTING PLATE AND METHOD OF MAKING IT

Filed Nov. 8, 1957

Inventors.
Robert B. Wentworth.
Kenneth L. Strachan.
By. Schroeder, Hofgren, Brady & Wegner.
Attorneys.

3,008,409
Patented Nov. 14, 1961

3,008,409

ALLOY PRINTING PLATE AND METHOD OF MAKING IT

Robert B. Wentworth, Chicago, and Kenneth L. Strachan, Glenview, Ill., assignors to R. R. Donnelley & Sons Company, a corporation of Delaware Filed Nov. 8, 1957, Ser. No. 695,429
7 Claims. (Cl. 101—395)

This invention relates to an etched magnesium alloy printing plate which may be reproduced in quantity from an original form, and a process for producing such printing plates. A major step in the process is one which increases the adherent quality of a resist on a magnesium alloy plate.

To secure economical and expeditious production of large editions such as magazines, telephone directories and mail order catalogues it has been necessary in the past to print, at the same time, on a number of duplicate plates identical with the original plate. These duplicate plates have normally been made by two processes known as stereotyping and electrotyping, each of which requires that an intermediate mold be produced, in which the duplicate plates are cast.

Obviously, any such molding process is somewhat time consuming and tedious. The printing industry has searched for a number of years for a simpler and faster method of producing the necessary duplicate plates.

It is also well-known in the art of photo-engraving that an acid soluble metal such as magnesium and its alloys may be used to make a metal printing surface. In so doing, a light sensitive coating or the like is applied to the surface, exposed and developed. The exposed coated surface forms an acid resistant coating. This coating or resist may then be further hardened in other manners before the metal plate is etched. In the past, however, magnesium has not been used too widely because of the time-consuming and costly operations required in etching to produce a satisfactory plate.

It is therefore, the principal object of this invention to provide a process for producing duplicate printing plates from an original form that is far simpler and faster than the prior art methods.

It is a further object of this invention to provide a process for duplicating printing plates which involves treating a blank magnesium plate chemically to provide a resist adherent surface, printing the original form on the plate in an acid and solvent resistant ink, fortifying the ink by the application of a compatible resin, heating the plate to fuse the ink and resin into a resist and etching the plate with a suitable etchant.

It is a still further object of this invention to provide a process for increasing the adherent quality of a resist on a magnesium plate which consists of treating the plate with a dilute solution of hydrofluoric acid to provide a resist adherent surface.

Other objects and advantages of the invention will appear from the following description and accompanying drawing.

In the drawing, in which a plate is shown which, for illustrative purposes, has several letters of the alphabet reproduced on its surface:

Figure 1:
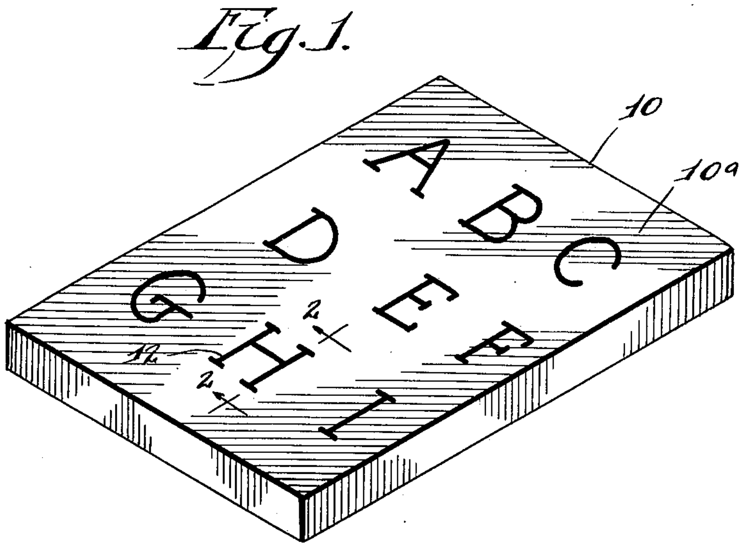
FIG. 1 is a perspective view of a duplicate printing plate as it appears prior to etching.
Figure 2:
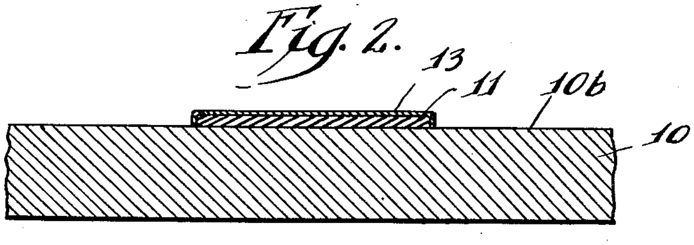
FIG. 2 is a fragmentary section on a greatly enlarged scale, taken substantially along the line 2—2 of FIG. 1, with the ink and resin coating relatively thickened for clarity of illustration.

In pursuing the processes of this invention an original printing plate may be simply reproduced on a blank magnesium plate 10. The blank magnesium plate may be of any size or shape desired and may also be any one of a number of satisfactory alloys used for this purpose and containing small amounts of other metals. For example; a satisfactory alloy produced by Dow Chemical Company of Midland, Michigan is a product called Zomag which contains by weight about 97% magnesium, about 2% zinc and about 1% aluminum. So long as the magnesium alloy is one which is acid soluble and therefore etchable, it will be satisfactory for use in the process of this invention.

The plate surface 10*a* must of necessity be relatively clean before it is used in order to eliminate harmful side reactions such as pitting. In order to remove old oxides and greases, the plate is first cleaned. A mixture of potassium fluoride crystals and pumice has proved satisfactory for this purpose. The plate should then be washed with distilled water.

The plate is then pre-treated with dilute hydrofluoric acid in order to improve the resist adherent properties of surface 10*a*. Preferably the pre-treatment is carried out by immersing the plate in an acid bath and allowing the reaction between the magnesium and the acid to go to completion. The concentration of the acid used is from about 1 to 8% by volume with about 2–6% preferred and with about 3% being most preferred. With an acid concentration of about 2 to 4%, the reaction between the plate and the acid will go to completion in about 3 minutes at room temperature.

It is important that the water used to dilute the acid be pure since impurities in the water, such as chlorides and the like, will promote harmful side reactions. Thus distilled water is desired.

In reproducing the original plate form on the prepared surface 10*a* of plate 10, an acid and solvent resistant ink is used, and transfer of the ink to the plate, to form an ink reproduction 11 of a character, is best performed by the offset process.

The hardness of the offset blanket is important insofar as it determines the quality of the letters transferred from form to plate. In determining a satisfactory offset blanket hardness, the thickness of the blanket is also important in that the satisfactory range of durometer hardness readings will vary with thickness. For instance, with a blanket having a thickness of about .042 of an inch a durometer of 84 is satisfactory. With a thicker blanket a higher durometer would be satisfactory because of the inherent elasticity of the blanket. The use of such blankets and their relationship to the offset-type of printing is well-known in the art and therefore the choice of a proper blanket may be easily made by one skilled in the art.

The acid and solvent resistant ink which is to be used in the process of this invention must be one that will adhere to the pretreated surface 10*a* of the magnesium alloy plate. It must further be a slow drying ink at room temperature and therefore stable on the press. Moreover, it must be very stiff and yet have proper body for satisfactory transfer characteristics. A satisfactory ink which may be classified as an alkyd-type ink, is one which contains by weight about 59% alkyd modified china wood oil, about 36½% pigment, including about 18% carbon black and about 18½% other pigments, about 4% by weight of a dryer such as cobalt octoate, or cobalt linoleate, or other non-cobaltic dryers known to the art, and about ½% of an antioxidant such as oil of cloves.

Once the original character has been reproduced on the magnesium plate in the form of an ink film 11, it is necessary to fortify the ink film in order to provide a satisfactory resist. This is done by spraying or dusting on a compatible finely divided resin powder to form a resin layer 13 over the ink 11. This resin must be one which has acid and solvent resistant characteristics and must further be thermoplastic so that it may flow to form a continuous film during baking. An example of a satisfactory powder of this type is a vinyl chloride polymer manufactured by B. F. Goodrich Chemical Company under the trademark "Geon 121." This powder has a mesh size, measured on the Tyler Scale by wet screen analysis, of about 200; a specific gravity of about 1.40; a maximum ash content of about 0.1%; and a moisture content of about 0.7%. "Compatible" is used herein to denote that there are no undesirable reactions between the resin and the other materials used in the process.

Once the vinyl chloride polymer powder has been applied to the freshly inked surface, it is necessary that the excess powder be removed from the area 10*b* surrounding the characters. This may be done with an air blast or by dabbing with cotton or the like, as is well-known in the art. However, it is also possible by adding a small amount of a mixed amine acetate to the vinyl chloride copolymer to substantially prevent adherence of the powder to the adjacent areas 10*b* in the first place. A satisfactory mixed amine acetate for this purpose is produced by Armour and Company under the trademark "Armac TO" and contains the mixed acetates by weight of about 70% of the acetate of abietyl amine, about 15% of the acetate of octadecenyl amine and about 15% of the acetate of octadecadienyl amine. Since the "Armac TO" is water soluble, a satisfactory amount may be added to the polymer by dissolving about 5 grams of "Armac TO" in a liter of distilled water and mixing therewith about 5 lbs. of "Geon 121." The mixture may then be drained on a Buechner funnel and dried in a moderately warm oven.

Figure 3:
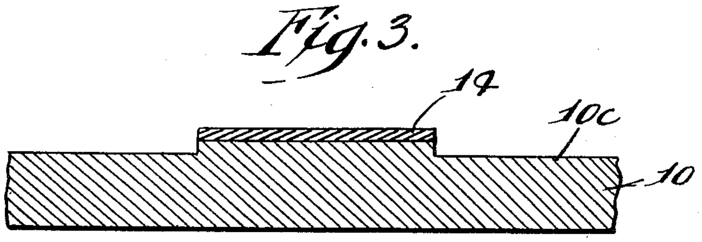
FIG. 3 is a view similar to FIG. 2 after the plate has been heat treated and etched.

After removal of excess polymer from the areas 10*b*, the plate is placed in a baking oven in order to fuse the ink film 11 and resin 13 into a satisfactory resist 14 (FIG. 3). The temperature of the oven and the time of baking may vary depending upon other considerations such as the thickness of the ink film, the drying time of the ink and the thickness of the magnesium plate. For example, when using a 16 gauge Zomag plate, an ink containing by weight about 59% alkyd modified china wood oil, about 36½% pigments, including about 18% carbon black and about 18½% other pigments, about 4% of a dryer such as cobalt octoate or cobalt linoleate, or others known to the art, and about ½% of an antioxidant, with a film thickness of .0001 to .0002 inch, about three minutes at 540° F. is satisfactory. At lower temperatures a longer period is necessary. For instance, at 435° F. with the same plate, ink and ink film thickness it takes about 8 minutes to properly fuse the resist.

The plate is next cooled in preparation for etching. The etchant itself may be any suitable etching acid which reacts with the magnesium alloy and not the resist and gives the result shown at 10*c* in FIG. 3. Normally, dilute nitric acid is used to achieve the results desired, as is well-known in the prior art. A more satisfactory etchant for these purposes, in order to provide directional etching, is produced by Dow Chemical Company and is used in the Dow-etch process. These etchants, as well as a device in which they may be used, are fully described in the U.S. Patents to Easley: Nos. 2,640,763; 2,640,764; 2,640,765; 2,640,766; 2,640,767; 2,669,048; and 2,763,536. The duplicated plate after etching may be cleaned with water, dried and then is ready for use on a printing press.

In one example of producing duplicate plates by the process of this invention, a telephone book form was reproduced on a magnesium alloy plate containing 97% magnesium, 2% zinc, and 1% aluminum. The plate was pre-cleaned using a mixture of potassium fluoride crystals and pumice and was thereafter washed in distilled water and dried. The plate was then dipped in a hydrofluoric acid bath having a concentration of about 2 to 4% by volume and was agitated slightly in the bath until the reaction between the acid and the plate went to completion which took about three minutes. The original plate was then placed in an offset press and printed using an alkyd-type ink containing by weight 59% alkyd modified china wood oil, 18% carbon black, 18½% other pigments, 4% of cobalt octoate as a dryer, and as an anti-oxidant, ½% of oil of cloves. An offset blanket having a thickness of about .042 inch and a durometer of about 84 was used on the offset press. After printing, the freshly inked surface was dusted with "Geon 121" containing a small amount of "Armac TO" mixed in the ratio of 5 grams of "Armac TO" to 5 lbs. of "Geon 121." The plate was then baked for about 3 minutes at 540°, cooled, and etched in nitric acid bath having a concentration of about 10% by weight until a suitable etch depth was achieved. The plate was then removed from the acid, washed in tap water, dried and placed on a suitable press for producing printed matter.

The foregoing detailed description is given for clearness of understanding only and no unnecessary limitations should be understood therefrom as some modifications will be obvious to those skilled in the art.

We claim:

1. In a process for producing a duplicate printing plate from an original form, the steps of: treating a blank magnesium alloy plate with a dilute substantially pure solution of hydrofluoric acid to provide a resist adherent surface; printing the original form on said plate in an acid and solvent resistant ink; fortifying said ink by the application of a compatible thermoplastic acid and solvent resistant resin; and heating said plate to fuse said ink and resin into an acid and solvent resistant resist.

2. In a process for producing a duplicate printing plate from an original form, the steps of: treating a blank magnesium alloy plate with a dilute substantially pure solution of hydrofluoric acid to provide a resist adherent surface; printing the original form on said plate in an acid and solvent resistant ink; fortifying said ink by the application of a compatible thermoplastic acid and solvent resistant resin; heating said plate to fuse said ink and resin into an acid and solvent resistant resist and etching said plate with an etchant which reacts with said plate but not with said resist.

3. In a process for producing a duplicate printing plate from an original form, the steps of: treating a blank magnesium alloy plate with a dilute substantially pure solution of hydrofluoric acid and allowing the reaction to go to completion; printing the original form on said plates in an acid and solvent resistant alkyd ink; fortifying said ink by the application of a compatible thermoplastic acid and solvent resistant resin powder; and heating said plate at a temperature and for a time sufficient to fuse said ink and resin into an acid and solvent resistant resist.

4. In a process for producing a duplicate printing plate from an original form, the steps of: treating a blank magnesium alloy plate with a dilute substantially pure solution of hydrofluoric acid having a concentration of from about 1–8% by volume and allowing the reaction to go to completion; printing the original form on said plate in an acid and solvent resistant alkyd ink comprising alkyd modified China wood oil and carbon black; fortifying said ink by the application of a finely powdered vinyl chloride polymer; and heating said plate at a temperature and for a time sufficient to fuse said ink and resin into an acid and solvent resistant resist.

5. In a process for producing a duplicate printing plate from an original form, the steps of: treating a blank magnesium alloy plate with a dilute substantially pure solution of hydrofluoric acid having a concentration of from about 2–6% by volume and allowing the reaction to go to completion; printing the original form on said plate in an acid and solvent resistant alkyd ink comprising by weight about 59% alkyd modified China wood oil, about 36½% pigments which include about 18% carbon black, about 4% of a dryer and about ½% of an anti-oxidant; fortifying said ink by the application of a finely powdered vinyl chloride polymer containing a small amount of the mixed acetates of abietyl, octadecenyl and octadecadienyl amines; and heating said plate at a temperature and for a time sufficient to fuse said ink and resin into an acid and solvent resistant resist.

6. The process of claim 5 wherein the concentration of said acid is about 3% by volume, said mixed acetate contains by weight about 70% of the acetate of abietyl amine, about 15% of the acetate of octadecenyl amine and about 15% of the acetate of octadecadienyl amine and is present in said vinyl chloride polymer in the ratio of about 5 grams of said mixed acetate to about 5 lbs. of vinyl chloride polymer.

7. A printing plate comprising: a magnesium alloy plate having raised characters the surfaces of which are covered with a resist adherent surface comprising the reaction product of said plate surface and a dilute substantially pure solution of hydrofluoric acid a fused resist comprising, an acid and solvent resistant ink comprising by weight about 59% alkyd modified China wood oil, about 36½% pigments which include about 18% carbon black, about 4% of a dryer and about ½% of an anti-oxidant, and a compatible acid and solvent resistant resin.

References Cited in the file of this patent

UNITED STATES PATENTS

| | | |
|---|---|---|
| 567,926 | Strecker | Sept. 15, 1896 |
| 747,791 | Southwood | Dec. 22, 1903 |
| 1,171,725 | Jones | Feb. 15, 1916 |
| 1,330,581 | Coulson | Feb. 10, 1920 |
| 1,687,593 | Sass | Oct. 16, 1928 |
| 2,521,648 | Ott | Sept. 5, 1950 |
| 2,613,165 | Fischer | Oct. 7, 1952 |
| 2,762,694 | Newman | Sept. 11, 1956 |